May 6, 1952    A. RYFFEL ET AL    2,595,889
PERFORATED-TAPE CONTROL OF HIGH-SPEED
TABULATING-CARD PUNCHES
Filed Oct. 24, 1945    9 Sheets-Sheet 1

Inventors
Albert Ryffel
Carl P. Rehsteiner
by Sommers + Young
Attorneys

Patented May 6, 1952

2,595,889

UNITED STATES PATENT OFFICE 2,595,889

PERFORATED-TAPE CONTROL OF HIGH-SPEED TABULATING-CARD PUNCHES

Albert Ryffel and Carl Paul Rehsteiner, Zurich, Switzerland, assignors to International Business Machines Corporation, New York, N. Y.

Application October 24, 1945, Serial No. 624,266
In Switzerland June 22, 1945

7 Claims. (Cl. 164—115)

The present invention relates to systems for producing business records by the method of recording information on tapes and subsequently utilizing these tapes to prepare record cards bearing said information.

There are many instances in which it is found convenient to use tapes as media for preparing other records in the form of cards. Tape records are very compact and they can be transported or transmitted with ease. When the information recorded on a tape is to be utilized in a card-controlled business machine, it must, of course, be converted into the standard card form. In the known systems for converting tape records to the corresponding card records, it is the practice generally to punch one column or character of data at a time. Thus, for a record card having 80 columns, there might be as many as 80 successive column punching steps per card, assuming that information is to be recorded in all columns of the card. The rate at which record cards are punched under such a procedure is necessarily limited by the speed at which the card punching mechanism can function.

There is available at the present time a high-speed card punch in which there are only as many punching steps per card as there are index points in a card column. Considering, for example, the well known form of record card in which there are 80 columns of 12 index points each for representing data according to the differential Hollerith code, this high-speed card punch would be required to perform only 12 punching steps per card. This requires much less time than would be necessary to perform, say, 80 punching steps per card in the column-by-column type of punch. The high-speed card punch is capable of operating simultaneously upon an entire line of index points extending across all 80 columns of the card in each step of the punching operation, and since there are only 12 lines of index points per card, only 12 punching steps are required. This materially increases the rate at which cards may be punched.

Normally, the index point line-by-index point line type of high-speed card punch is operated under the control of a pattern card which is sensed in a corresponding index point line-by-index point line fashion, as, for instance, is disclosed in the patent to International Business Machines Corporation, Swiss 183,563, granted July 1, 1936 (corresponding to Lake's reissue patent, Re. 21,133, granted June 27, 1939). No proposal has been made heretofore to operate this type of card punch under the control of a tape reader for a tape wherein the combinations of holes are placed transversely of the tape, the tape reader sensing a column of code hole combinations at one time. It is a well-known practice to read tapes in the manner just described. The various characters that make up the data recorded on the tape are respectively represented by the hole combinations located in individual transverse columns on the tape, and these columns are sensed successively by the tape reader a whole column at a time, thereby causing the individual characters to be read in sequence. The high-speed card punch just described does not record data on a card in column-by-column sequence, but operates upon the index points of the card in index line-by-index line sequence instead. Because of this fundamental difference in the operations of the high-speed card punch and the type of tape reader just referred to, it has not been proposed until now to operate the former under the control of the latter.

A proposal has been made (for example, in patent to A. H. Dickinson et al., No. 2,224,764, granted December 10, 1940) to operate a high-speed card punch under the control of a special record tape containing an exact pattern of the information to be recorded on each card in the statistical code, with the transverse columns of the tape corresponding to the longitudinal index lines on the card. This type of a system has the disadvantage that it requires special tape recording and tape reading facilities and, therefore, would not be compatible with most of the commercial tape handling systems that are in use at the present time.

We have for an object the provision of a novel tape-controlled card perforating machine which utilizes a high-speed card punch of the index line-by-index line type operating under the control of a tape scanning device which reads tape information in the customary manner, that is, in column-by-column sequence, said columns being placed transversely of the tape.

Another object of our invention is to provide a new and important field of use for high-speed card punches.

A further object is to provide an improved data transfer and storage apparatus adapted to supply a high-speed card punch of the index line-by-index line type with data derived from a combinational code tape (having columns of code hole combinations respectively representing characters placed transversely of the tape) by means of column-by-column tape scanning means, such data being supplied to the card punch in index line-by-index line sequence at a high rate sufficient to insure the most desirable utilization of the card punch.

In carrying out the foregoing objectives we provide, in combination, a high-speed card punch of the type which perforates a card in only 12 punching actions (assuming 12 index points per card column) instead of 80 punching actions (or as many as there are active columns on the card), a tape scanning device which reads in column-by-column sequence the transverse columns of data which are recorded on a tape, there being a combinational code representation of a data character in each transverse column, one or more storage units adapted to store information in code form according to a statistical code (such as the Hollerith differential code) which is different from the combinational code used in the tape record, together with one or more transfer devices for setting up these storage devices under control of the tape scanning means, and appropriate readout means for causing the high-speed card punch to operate in index line-by-index line sequence under the control of the storage devices containing the lines of information that are to be recorded on the card. The tape employed to control this card punching machine may be prepared in any suitable manner. In the system disclosed herein, the tape is perforated by means of a tape punching attachment on a typewriter to represent, in combinational code form, the characters printed by the typewriter, together with any additional control symbols that may be needed. One or more of these tapes may be used to control a single high-speed card punch, the general intent being to keep the card punch operating at its maximum utility.

The above-stated objects and features of the invention, together with other objects and features not specifically pointed out hereinabove, are set forth in the following description and claims and illustrated in the accompanying drawings, which disclose, by way of examples, the principle of the invention and the best mode, which has been contemplated, of applying that principle.

*General description of system*

Figure 1:
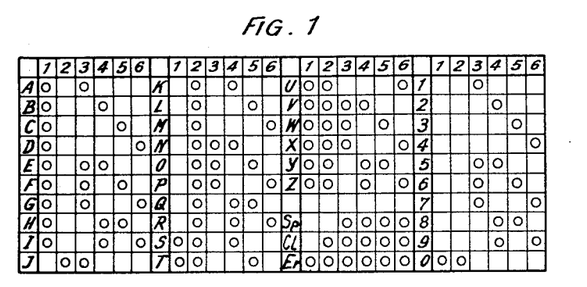
Fig. 1 is a table illustrating a 6-hole combinational code employed for representing on a perforated tape various typewriter characters and special symbols for use in the illustrated embodiment of the invention.
Figure 2:
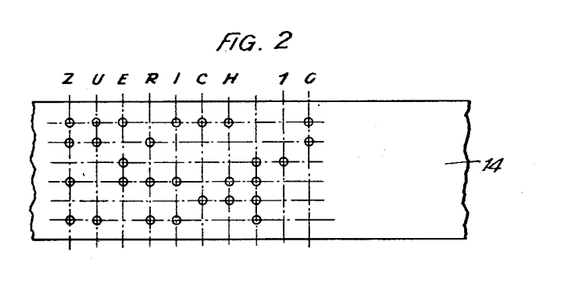
Fig. 2 is a fragmentary view of a tape punched to represent a portion of a record.
Figure 3:
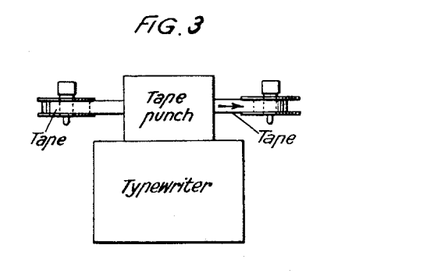
Fig. 3 is a diagrammatic view of a typewriter tape punch for preparing a tape record.
Figure 4:
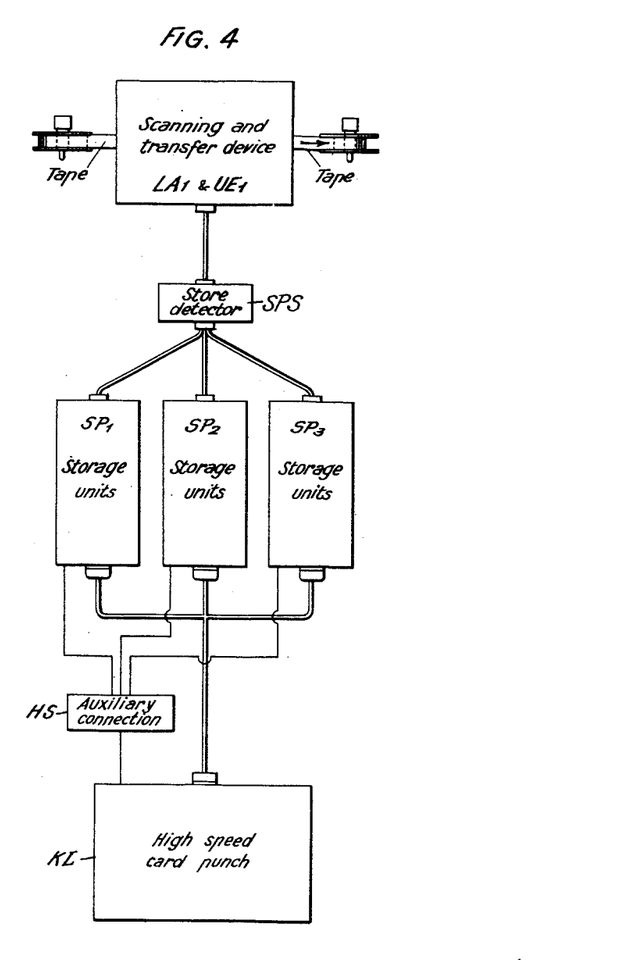
Fig. 4 is a diagrammatic view of a tape-to-card system in which the principles of the invention may be utilized for punching record cards in accordance with the information perforated in a tape.

The system illustrated in Fig. 4 is adapted to perforate information in 80-column record cards (such as the card L*f* in Fig. 7) according to a 12-unit statistical, or differential Hollerith, code, under the control of a record tape such as 14 (Fig. 2) which is perforated in accordance with a 6-hole combinational code (Fig. 1). It is proposed also herein (see Fig. 9) to utilize a plurality of tapes or tape reading stations to control a single card punch. The tape or tapes may conveniently be prepared in the tape-punching unit of a typewriter tape punch (Fig. 3). Inasmuch as the present invention does not relate directly to the means for preparing the tape, the details of the machine illustrated in Fig. 3 are omitted. Machines of this type, furthermore, are well known in the art.

Information is perforated in the tape 14 in accordance with the combinational code shown in Fig. 1. Each character of the information is represented in an individual column extending transversely across the tape. The letter A, for example, is represented by two holes, one in the first index position and the other in the third index position of its particular column. The illustrated 6-hole code provides for the representation of all letters in the alphabet, together with the digits 0 to 9, and three special symbols, namely, "Sp" (space), "Cl" (closing), and "Er" (error).

Information is represented in the record card according to the familiar Hollerith 12-unit differential code (hereinafter referred to as a "statistical" code), wherein each character is represented by one or two holes in an individual column of the card. By a "column" is meant a series of aligned index points (in this case twelve) extending transversely across the card. The Hollerith card code being well known in the art, no description of it will be given herein.

The invention contemplates the use of a high-speed card punch KL (Figs. 4 and 7) of the type shown in the above-mentioned Lake reissue patent Re. 21,133, corresponding to Swiss Patent 183,563. This punch is adapted to operate simultaneously upon an entire line of index points extending longitudinally of the card, across all 80 columns thereof. With this type of punch, the card is perforated in 12 steps, one for each index point in a card column. The tape 14, however, is scanned in a different fashion, with the various transverse columns thereof being sensed consecutively so that the information is read from the tape in column-by-column sequence. The present invention enables the high-speed card punch to be used speedily with the type of tape scanning means just described.

*Punched-tape scanning device and transfer device (Figs. 5a, 5b, 8 and 9)*

Figure 5A:
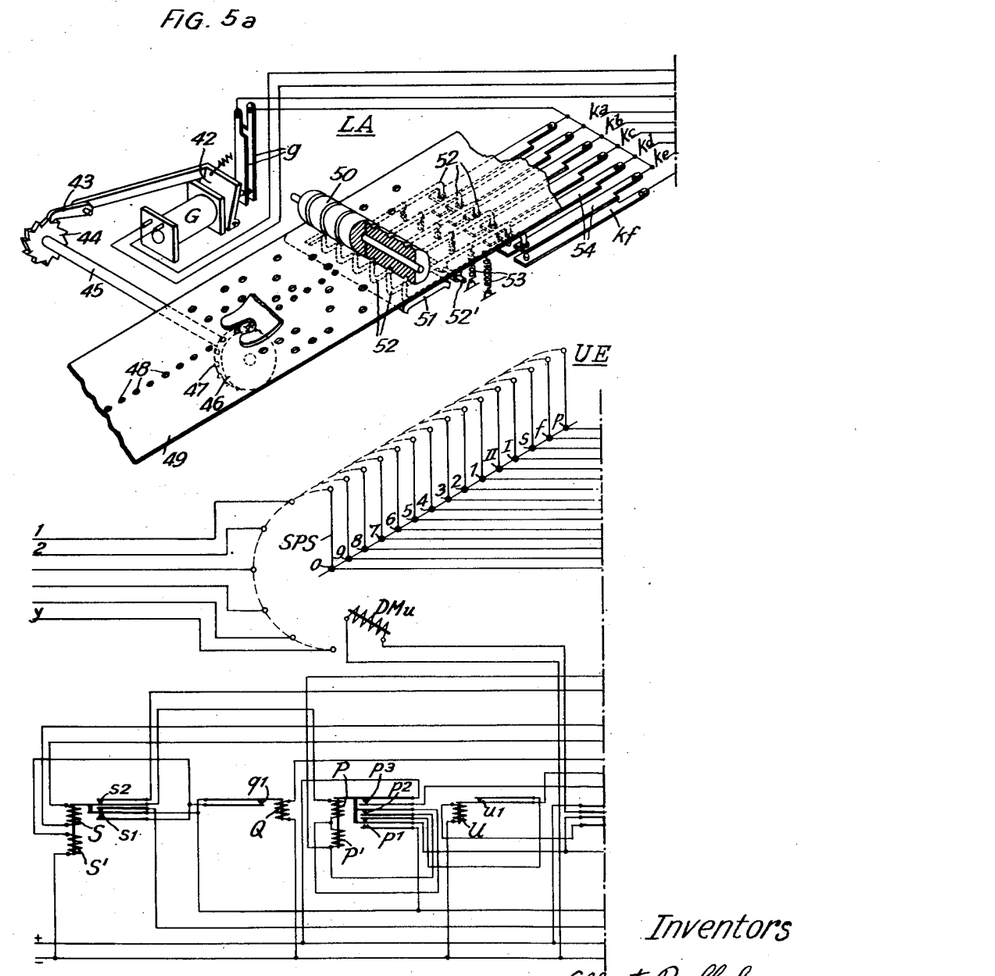
Figs. 5a and 5b, when joined together, schematically illustrate a scanning and transfer device used in the system of Fig. 4.
Figures 5B, 5C:
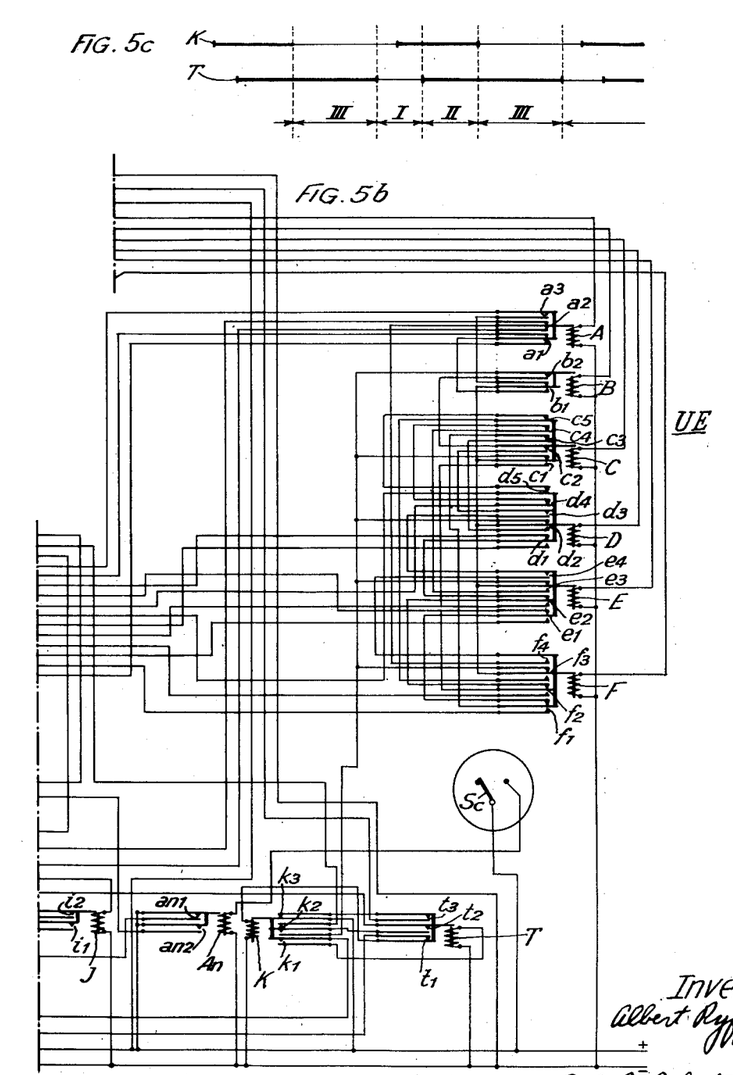
Fig. 5c is a schematic representation pertaining to Figs. 5a and 5b.

The punched-tape scanning device LA, the transfer device UE, the storage unit SP and the card-punching machine KL are operated by cutting in the switch Sc.

When cutting in the latter, the circuit for the relay A*n* is completed, the relay is excited and remains so while the switch Sc stays cut in, that is, over the entire period of scanning, transferring, storing and punching the punch cards.

When the relay A$n$ responds, a circuit for the relay J is completed, upon making the contact $an_1$, over the contact $p_1$ and $u_1$ made in the position of rest. The made contact $i_2$ of the energized relay J completes a circuit for the turning magnet DM$u$ of the store detector SPS, thereby moving the switch arms of the latter from the 0-position for one notch into the contacts of the first store.

The circuit for the relay U is completed over the closed contactors $i_1$ and $an_1$, and the contactor $u_1$ is opened when the relay U is excited. At this moment the relay J is interrupted and drops off; and the circuit for the turning magnet DM$u$ is also interrupted by opening the contactor $i_2$.

The wire $p$ of the store detector SPS tests whether the first store be occupied or not. If it is occupied, the relay P is not excited over the contactors $an_2$ and $s_2$, and the relay U, after the relay J has dropped off, is again de-energized due to breaking the contact $i_1$, so that the holding contact $u_1$ is again made and completes the circuit for the relay J. The turning magnet DM$u$ thus is again energized over the contact $i_2$ and is turned on to the second store. If the latter is also occupied, the turning magnet is switched onto the third store and so on.

If a store is free, a circuit for the relay P is completed by way of the positive pole of the current source, the contact $an_2$, the contact $s_2$ closed in the position of rest, the two coils of the relay P, the wire $p$ and the store, to the negative pole, and the relay P is energized. When switching over the alternating contactor $p_1$, the circuit for the relay J is interrupted, and the turning magnet DM$u$ of the store detector comes to rest over the respective store. The high-ohmic coil P' of the relay P is bridged over the contact $p_2$, and this store is blocked against further deposits from the part of other store detectors in that their relay P cannot be excited over the contact arm $p$, since the high-ohmic coil of the latter is shunted relative to the low-ohmic coil of the relay P, the high-ohmic coil of the latter having been bridged.

A circuit for the relay K now is completed over the operating side of the commutator $p_1$, and the contactors $s_1$, $t_1$ and $an_1$. The relay is excited, and thus also the relay T over the contactors $k_1$, $p_1$ and $an_1$. The latter relay causes the relay K to drop off again due to breaking the contact $t_1$, and itself again becomes de-energized due to the breaking of the contact $k_1$, thus allowing the relay K to pick up anew. This cycle is repeated, until the relay S responds from a cause to be described hereinafter.

During the operative phases I, II, III of the relays K and T, schematically represented in Fig. 5c, the punched tape is scanned, transmitted into the store SP column after column, the forward movement being effected by means of the distributing selector VWS.

When the relay K drops off, the relay T still is cut in for a certain length of time (operating phase III) so that a circuit for the magnet G of the tape movement is completed over the holding contact $k_3$ and the operating contact $t_3$. The magnet G is energized and also drops off again, together with the relay T. When the magnet armature 42 is pulling up, the ratchet wheel 44 is moved ahead one notch by means of the pawl 43, taking the cam wheel 46 along over the shaft 45. The feed lugs 47 engage a line of perforations 48 in the tape 49, and thus move the latter step by step from punched column to punched column.

The punched tape 49 is passed between a drum 50 and a guide plate 51 which is provided with six holes in line with the punched-tape cross columns. The bent-up ends of six feeler levers 52, which latter are fulcrumed on the pin 52' and subjected to the action of springs 53, engage the said six holes in the guide plate 51 to abut against the tape 49. Six contactor springs 54, secured to the rear ends of the levers 52, coact with the six longitudinal rows of perforations in the tape 49. Six contactors $ka$ to $kf$ cooperate with the said springs 54.

Circuits for the relays A to F are completed by way of these contacts and a holding contactor 9 in accordance with the perforation combinations of the punched tape, making the respective contact $ka$—$kf$ when a bent-up feeler end enters a hole of the punched tape. The corresponding relay A—F then is excited, being picked up during the operating phase I, held through the phase II, and dropping off again in the phase III.

When the relay K drops off and the relay T is still cut in (operating phase III), a circuit for the turning magnet DM$s$ of the distributor selector VWS of the store SP is completed over the holding contact $k_2$, contact $t_2$, contact $p_3$ and the wire $f$ of the store detector. Said circuit is again broken when the relay T drops off, so that the selector at each operation is switched ahead one step in correspondence with the fixed space between the cross columns on the tape.

When scanning the tape 49, the contacts $ka$—$kf$ are made in accordance with the perforation combinations of the respective cross column of the tape, and the appurtenant relays A—F are actuated, thus starting the translation. According to which relay or relays A—F is or are energized, a circuit is excited for one or more magnets As—Ms of the store by way of the respective contacts and over one or more of the wires I, II and 1 to 0 of the store detector.

As seen from Fig. 1, a hole in the third column is marking the numerical figure 1, and the relay C is energized when scanning same, completing thereby a circuit from the (plus) + pole of the current source over the working contacts $p_3$, $t_2$, $k_2$, holding contact $d_2$, or $e_3$ or $f_3$, working contact $c_1$, holding contacts $f_2$, $e_2$ and $d_1$ to the wire 1 of the store detector. The relay Cs of the store is thus energized.

When scanning the numerical figure 2, a hole is located in the fourth column of the tape, and the relay D is energized. The circuit completed is: + pole, working contacts $p_3$, $t_2$, $k_2$, holding contact $c_1$ or $e_3$ or $f_3$, working contact $d_2$, holding contacts $c_3$, $f_1$ and $e_1$, to the wire 2 of the store detector. The relay Ds of the store is energized.

When scanning the numerical figure 3, a hole is located in the fifth column of the tape, and the relay E is excited. The completed circuit is: + pole, working contacts $p_3$, $t_2$, $k_2$, holding contact $c_1$, $d_2$ or $f_3$, working contact 3, to the wire 3 of the store detector. The store relay Es is energized.

When numerical figure 4 is scanned, a hole is disposed in the sixth tape-column, and the relay F is energized. The completed circuit is: + pole, working contacts $p_3$, $t_2$, $k_2$, holding contact $c_1$, $d_2$ or $e_3$, working contact $f_3$ to wire 4 of store detector. The store relay Fs is energized.

In scaning the other figures or characters, for example, letters, two or more different contacts, according to Fig. 1, $ka$—$kf$ are made, and corresponding relays A—F are energized. Their completed circuits may be readily traced on Figs. 5a, 5b, 6a and 6b.

When scanning the space character $Sp$ on the tape, contacts $kc$—$kf$ are made by the perforations in the third to sixth tape column, and the relays C—F are excited. No circuit thus is completed from the + pole over the contacts $p_3$, $t_2$ and $k_2$ to the store-wires, so that no store relay is energized. Tape and distributor selectors, however, are moved onward in the usual way.

The scaning and transmitting operation is continued until the closing character $Cl$ appears on the tape. According to Fig. 1, this character comprises perforations in the columns 2—6, so that in scanning same contacts $kb$—$kf$ are made and the relays B—F excited. The wires I, II and I—9 remain currentless, the wire $s$, however, receiving current over the following circuit: + pole, working contacts $p_3$, $t_2$, $k_2$, $b_2$, $d_3$, $e_4$ and $f_4$, holding contact $a_2$ and coil of relay S. By reversing the commutator $s_1$, the relay K is switched off, so that the latter and the relay T are no longer excited, and the tape feed is interrupted. A holding circuit is completed for the relay S by the contactor $s_1$ over the coil S'. The relay S also breaks the test circuit over the relay P by means of its contactor $s_2$.

The relay P drops off, and thus also the relay S again. The relays J and U are thus again energized, and the store detector is looking for a free store again, and the scanning operation again proceeds in the manner described.

When "error" sign appears on the tape, which according to Fig. 1 comprises perforations in all six columns, all of the six contacts $ka$—$kf$ are made when scanning, and all of the relays A—F are excited. In place of the wire $s$, the relay Q is cut into the circuit completed from the + pole over working contacts $p_3$, $t_2$, $k_2$, $b_2$, $c_2$, $d_3$, $e_4$, $f_4$ and $a_2$. The coil S' of the relay S is cut in over the contact $q_1$. By exciting this relay S, the tape feed is interrupted in the same way and manner as in the case of the closing sign, and a further free store also is looked for. The difference, relative to the closing error, however, is that the wire $s$ is not energized so that all signs stored in the store are cancelled.

*Store and card-punching machine with auxiliary connection (Figs. 6a, 6b and 7)*

Figure 6A:
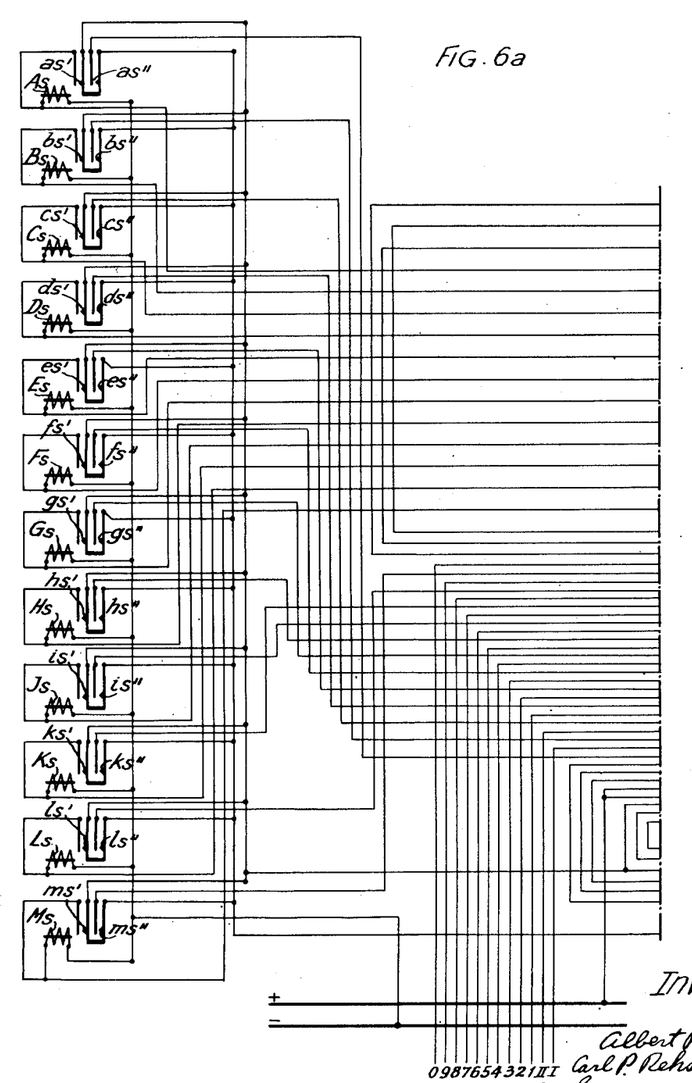
Figs. 6a and 6b, when joined together, schematically illustrate a storage unit employed in the system of Fig. 4.
Figure 6B:
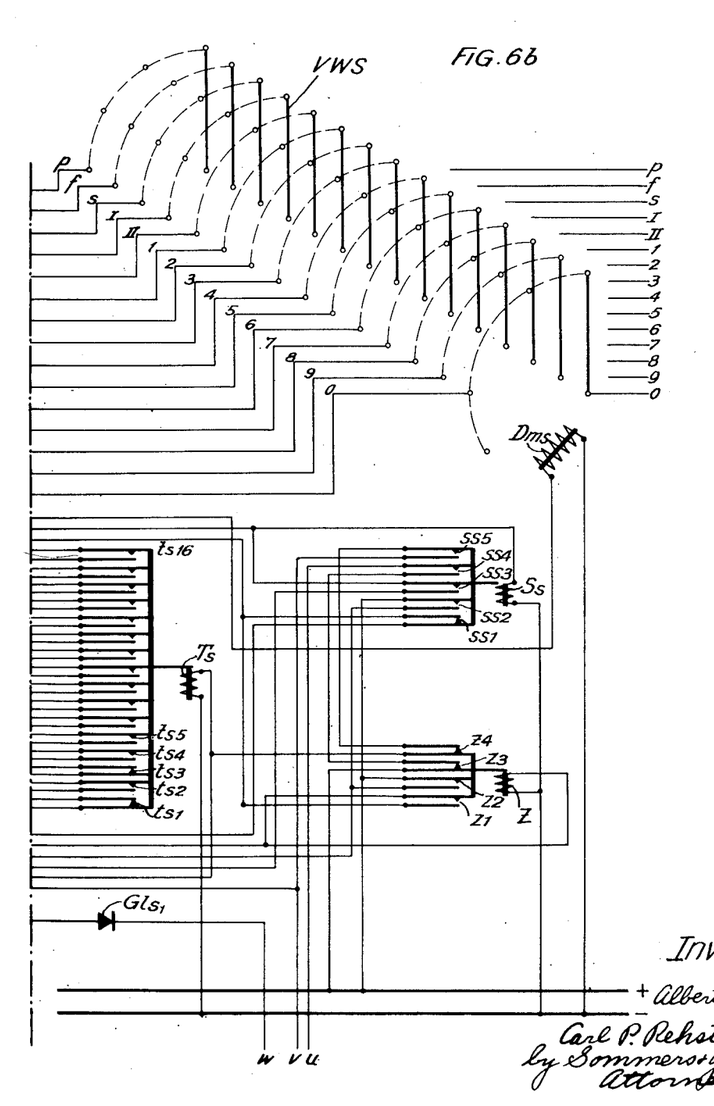

When a store SP is occupied and being filled by a scanning and transfer device UE, the relay Z is energized over the wire $p$ of the store detector SPS and the open circuit contacts $ss_1$ an $ts_1$. Further, impulses for the translation of the distributing selector reach the field coil DM$s$ of the rotary magnet over the wire $f$. Assuming that a type-written line comprises 80 figures and characters, 80 relay sets serving for storage are connected to each distributing selector and correspond to the columns of a tabulating card to be punched, and which are successively connected to the wires I, II and I—0. In accordance with the perforation combination of the punched tape, one or more of the relays A$s$—M$s$ in each of these relay sets is energized from the scanning and transfer device and is held over its proper contact $as'$—$ms'$ as well as the contact $z_2$, for example, for the numerical figure 1, e. g., the relay C$s$, for the figure 2 the relay D$s$ is excited, and so on.

When the closing sign $Cl$ appears in the scanning and transfer device, the relay S$s$ of the store responds over the wire $s$ and is held through its own contact $ss_3$ and an open-circuit contact $ts_3$. The plus pole is connected with the holding bus bar for the relays A$s$—M$s$ over e second contact $ss_2$, so that these relays A$s$—M$s$ remain energized after breaking the wire $p$ and dropping off the relay Z even when the scanning and transfer device is separated from the respective store.

When the error sign $Er$ appears in the transmitter, the relay Z drops off, after opening the wire $p$, without the relay S$s$ having been preenergized. Thus, no holding circuit remains for the relays A$s$—M$s$ after the contact $z_2$ is broken, and the respective store is at once released for further receptions.

When the relay S$s$ is excited and the relay Z has dropped off, after transmitting the closing sign, a circuit for the relay A$nh$ (Fig. 7) of the auxiliary wiring connection HS for the card-punching machine is completed from the + pole, o. c. contact $z_3$, c. c. contact $ss_4$, wire $u$, o. c. contact $ph_1$ of the relay P$h$ of the auxiliary wiring HS, to the o. c. contact $sh_1$ of the latter. When the relay A$nh$ is pulling up, a circuit is completed for the relay U$h$ from the + pole, contact $anh_2$, to the contact $dmh$ of the rotary magnet D$mh$ of the distributing sector of this auxiliary wiring. When this relay D$nh$ is excited, the rotary magnet D$mh$ is picked up over its contact $uh_1$ and releases the relay U$h$ by breaking contact $dmh$, causing the magnet to drop off, so that the swing selector is moved on step by step. Inasmuch as this action is familiar to those skilled in the art, further description of it is omitted herein.

Figure 7:
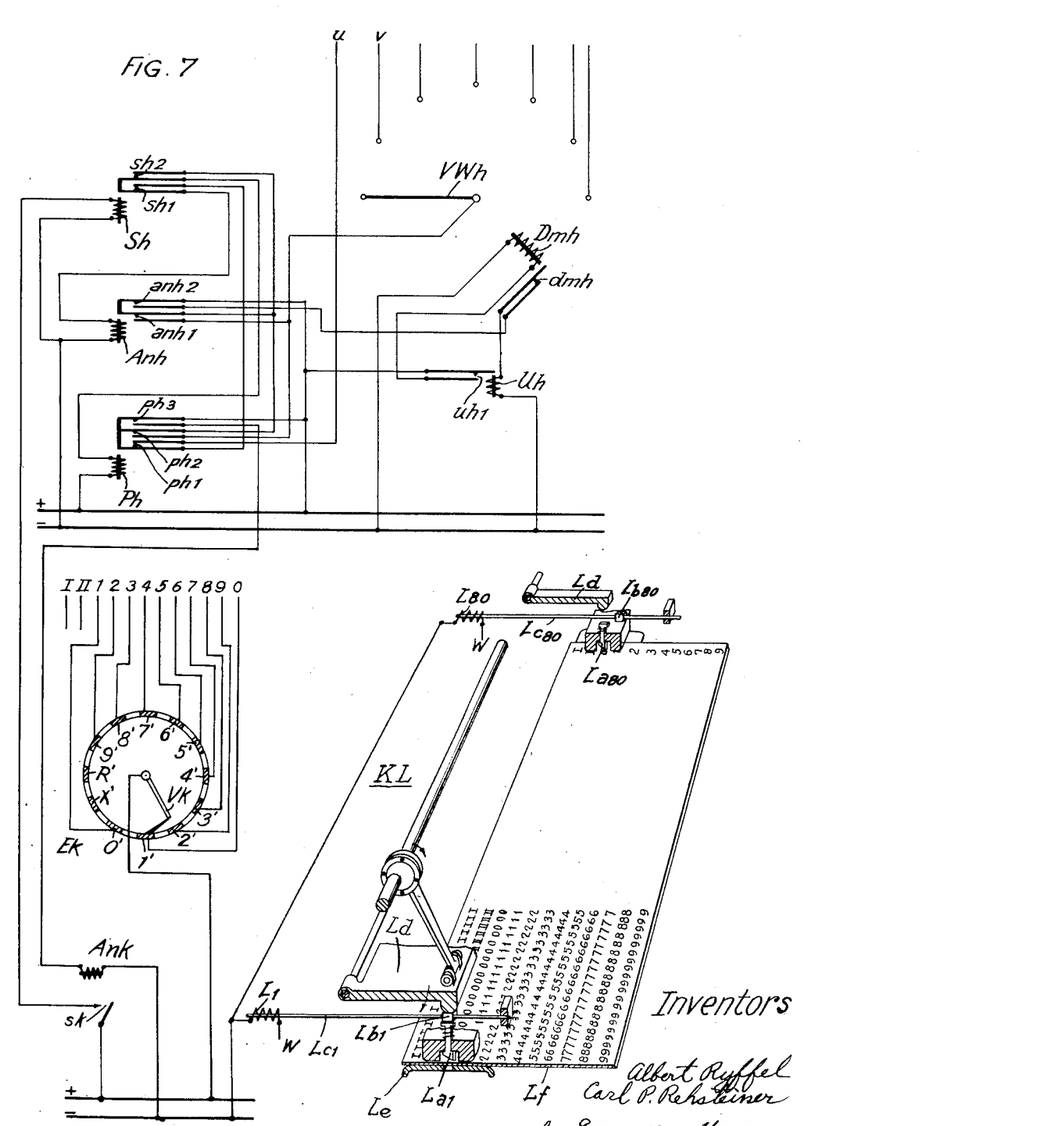
Fig. 7 is a combined schematic and perspective view of a card punch and associated circuits as used in the system of Fig. 4, this figure being a diagramized showing of the punch structure disclosed in Swiss Patent 183,563, mentioned above.

When the distributor switch arm of this selector VW$h$ abuts against the wire of the teasing store, a circuit is completed from the + pole, over coil P$h$, contacts $sh_2$ and $anh_1$, the distributor switch arm and the wire $v$ of the selector VW$h$, the c. c. contact $ss_5$ and the o. c. contact $z_4$ of the store, the coil of the relay T$s$ to the minus pole, thereby exciting the relay T$s$ in the store and the relay P$h$ in the auxiliary wiring HS for the card-punching machine.

The holding circuit for the relay S$s$ of the store is broken over the contact $ts_3$, and the said relay drops off. At the same time, the plus pole is connected to the holding bus bar for the relays A$s$—M$s$ by way of the contact $ts_2$, so that in spite of the relay S$s$ dropping off, the relays A$s$—M$s$ are held through.

When the relay P$h$ in the auxiliary wiring for the high-speed card-punching machine is pulling up, the holding circuit for the relay A$nh$ is broken, while the relay P$h$ remains energized over the contact $sh_2$ and its own contact $ph_2$. A circuit for the starting relay A$nk$ for the card-punching machine is completed over the contact $ph_3$, thus starting the machine by the means shown in the patents referred to in the next paragraph.

The high-speed card-punching machine KL is of known design as shown in the patent to International Business Machines Corporation, (Swiss) 183,563, granted July 1, 1936. In the present example, the punch comprises an emitter E$k$ (Fig. 7), wherein a distributor arm V$k$ is brushed over a plurality of contacts 0, I', 2'—9' connected to the wires I, II, I—0. The latter are hooked up to the corresponding wires of the store, thence by way of the contacts $ts_5$—$ts_{16}$, and $as''$—$ms''$, the rectifiers G$lsl$—80 and the wires $w$ to the punch magnets $L_1$—$L_{80}$ of the card punching machine.

The distributing arm V$k$ being located, for example, on the contact I', circuits are completed over the wire 0, contact $ts_{16}$ and those contacts $ms''$, the respective relays MS of which are energized, for the corresponding punch magnets $L_1$—$L_{80}$. The distributor arm $Vk$ then moves onto the contact $2'$ and circuits are again completed for the punch magnets $L_1$—$L_{80}$ by way of the wire $9$, contact $ts_{15}$ and the contacts $ls''$. The tabulating card, in the mean time, has been advanced one step so that holes now are punched into another card column. In the same way the punch magnets are successively connected with the contacts $ks$, $is$—$as$.

At the closing of the punching operation for a card, contact $sk$ is made in the punch KL, energizing thereby the relay $Sh$ of the auxiliary wiring set HS (Fig. 7). Contact $sh_2$ being made, the circuit, over which the relay $Ph$ of the auxiliary wiring set and the relay $Ts$ of the store were held, is broken. All store relays $As$—$Ms$ thus again drop off in the store, and the latter is ready for further receptions. The card punching machine also may be occupied anew, since the distributing selector $VWh$ of the auxiliary wiring set may check up on other stores. The rectifiers $Gl_{1-80}$ prevent unintentional circuit hookups over other stores.

Since the high-speed card-punching machine is known fully disclosed in the Swiss patent to International Business Machines Corporation, No. 183,563, granted July 1, 1936, the operation of the starting, stopping and various holding and auxiliary circuits thereof will not be described in detail.

Figure 9:
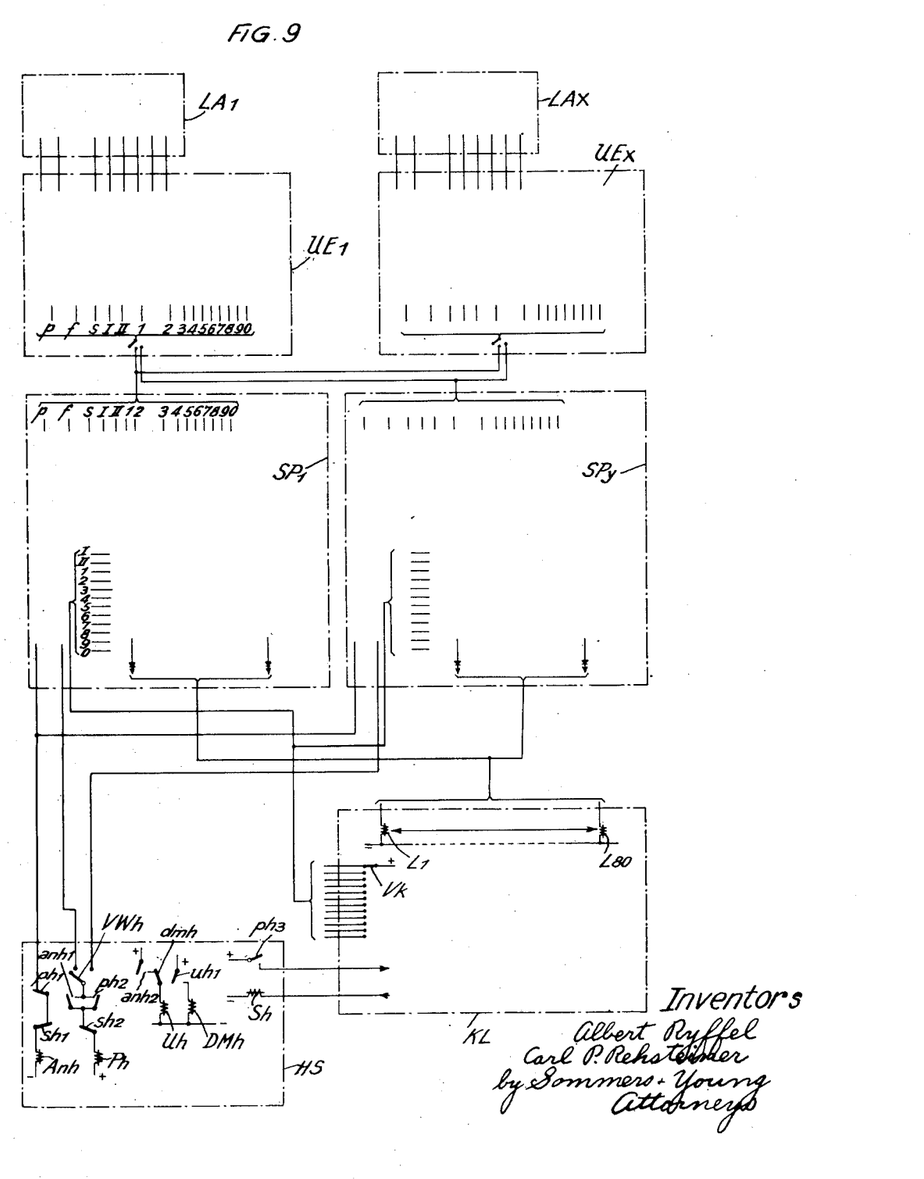
Fig. 9 is a condensed schematic view showing the system of the preceding views modified to utilize a plurality of tapes for controlling a single card punch.

The punching action is schematically shown in Figs. 7 and 9 where $La_1$ is the first punch, $Lb_1$ the first punch setter which under the action of the magnet $L_1$ along the rod $Lc_1$ is drawn into line with the punch $La_1$ so that the punch-hammer $Ld$ operating on an excenter drives the punch $La_1$ through the card $Lf$ into the die $Le$. In Fig. 7 the rod $Lc_1$ has moved the type setter $Lb_1$ over the punch $La_1$, whilst the rod $Lc_{80}$, assuming that the magnet $L_{80}$ has not been energized, has not moved and the punch is therefore not set.

Figure 8:
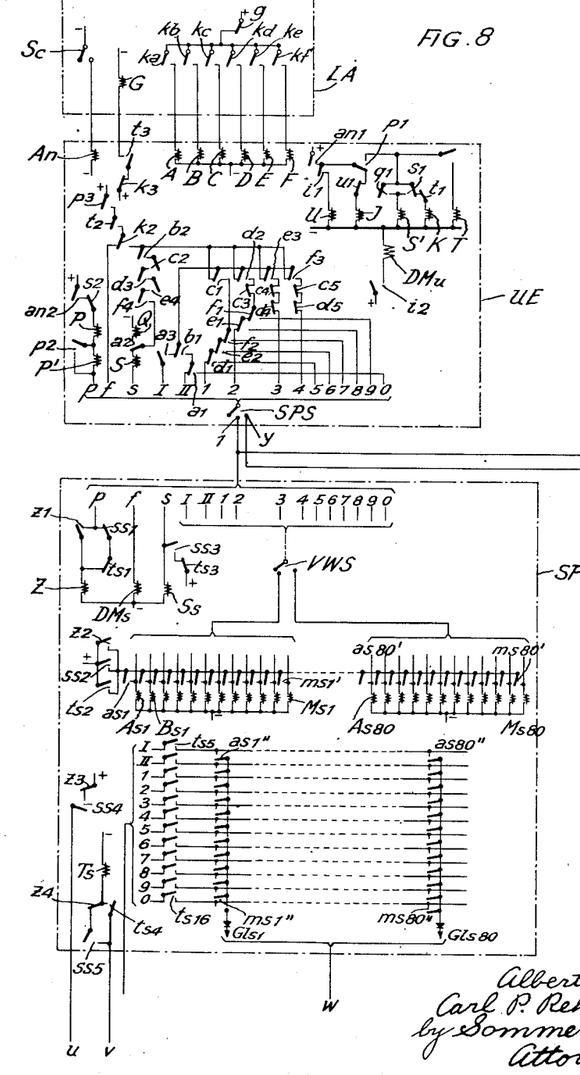
Fig. 8 is a condensed schematic view of a scanning and transfer device and a storage unit, in the system of Fig. 4.

The disposition and cooperation of the different scanning devices LA, transmitters $Ue$ and stores SP, as well as of the auxiliary wiring HS for the card-punching machine KL and of the latter itself is evident from Figs. 8 and 9, and is readily understood from the foregoing description.

While we have described what we consider to be a most practical embodiment of our invention, it is obvious that changes in form could be made without departing from the spirit thereof. We do not, therefore, limit ourselves to the exact form revealed herein nor to anything less than the whole of our invention as described above and as claimed below.

What we claim and desire to secure by Letters Patent is:

1. Apparatus adapted to be controlled by a record tape bearing combinational code representations of data arranged in columns extending transversely of the tape, with each column containing an individual character representation, for recording such data on a record card having columns of index point positions at which data representations may be recorded selectively according to a statistical code differing from said combinational code, and with each character of the data being recorded in an individual column of the card, such apparatus comprising tape scanning means for successively sensing the transverse columns of data representations on the tape so that the characters of data are sensed in sequence a whole character at a time, storage means containing storage devices arranged in sets corresponding respectively to the columns of the record card, with the individual storage devices of each set corresponding respectively to the various index point positions in each card column, transfer means for transferring the data sensed by said scanning means to said storage means, said transfer means including means for converting the combinational code representation of each character into the corresponding statistical code representation of said character and means for causing said sets of storage devices to be activated in sequence for storing column-by-column in statistical code form the data representations sensed by said scanning means, a row of recording elements arranged to record data representations concurrently in a line of corresponding index point positions extending across the various columns of the record card, and control devices operating in timed relationship with each other for causing the lines of corresponding index point positions on the card to be presented successively to said recording elements and for placing said recording elements successively under the control of the storage devices respectively corresponding to the index point positions in such lines.

2. In a card perforating system wherein data represented in columnar form on successive sections of a continuous punched tape are transferred section by section to statistical punched cards having columns of index points so arranged that corresponding index points are aligned transversely of the card columns, said data on the tape being designated in one code and the card punched data being in a different or statistical code, with each individual character of the data being represented in an individual column on the tape and on the card, respectively, the combination of means for feeding and analyzing in column-by-column sequence the data on said tape demarcating a section thereof, a plurality of sets of data-receiving storage devices, said sets corresponding in number to the columns demarcating a section of the tape and the storage devices within each set correspondingly respectively to the index points of the statistical code, transfer means under control of said tape sensing means as said tape is sensed for setting up said storage devices to represent the sensed tape data in the statistical code, said transfer means including translating means to convert each combinational code representation of a character in the tape data to the corresponding statistical code representation of said character, a card punching mechanism of the type adapted to operate simultaneously upon a line of corresponding index points on the card and successively upon the several lines of such index points, and means for causing upon the completion of setting up of data in one section of the tape the operation of said punching mechanism under control of said storage devices to punch a statistical record card representing data derived from a single section of a tape.

3. In a card perforating system wherein data represented in columnar form on punched tapes are transferred to statistical punched cards having columns of index points so arranged that corresponding index points are aligned transversely of the card columns, said data on the tapes being designated in one code and the card punched data being in a different or statistical code, with each individual character of the data being represented in an individual column on the tape and on the card, respectively, the combination of tape reading devices for feeding and analyzing in column-by-column sequence the data on said tapes, a plurality of storage units respectively controlled by said tape reading devices, each of said storage units comprising a plurality of sets of data-receiving devices, said sets corresponding respectively to a plurality of columns on a tape and the storage devices within each set corresponding respectively to the index points of the statistical code, transfer devices respectively controlled by said tape reading devices as said tapes are sensed for setting up the storage devices of each storage unit to represent the sensed tape data in the statistical code, each of said transfer devices including translating means to convert each combinational code representation of a character in the tape data to the corresponding statistical code representation of said character, a card punching mechanism of the type adapted to operate simultaneously upon a line of corresponding index points on the card and successively upon the several lines of such index points, and means effective when each of said storage units is set up in accordance with data derived from one of said tapes for causing said punching mechanism to operate under the control of said storage unit to punch a statistical record card representing data derived from said tape, said last-named means having a progressive action for operatively connecting said storage units in rotation to said punching mechanism.

4. Apparatus adapted to be controlled by a record tape bearing combinational code representations of data arranged in columns extending transversely of the tape, with each column containing an individual character representation, for recording such data on a record card having columns of index point positions at which data representations may be recorded selectively according to a statistical card code differing from said combinational code, and with each character of data being recorded in an individual column of the card, such apparatus comprising tape scanning means for successively sensing the columns of data representations on the tape so that the characters of data are sensed in sequence a whole character at a time, storage means containing storage devices arranged in sets corresponding respectively to the columns of the record card, with the individual storage devices in each set being equal in number and corresponding respectively to the various index point positions in each column of the card, translating means operatively interposed between said tape scanning means and said storage means for causing the tape code representations sensed by said scanning means to be stored in said storage devices as statistical card code representations, said translating means being operatively connected with said scanning means to function as a unit therewith for causing each card code representation of a character to be stored in a set of said storage devices substantially simultaneously with the sensing of the corresponding code representation of said character on the tape, recording means including a plurality of recording elements selectively operable to record data representations on the record card, operating means for said recording elements including means for testing each individual storage device to detect a data representation stored therein and means effective as each storage device is tested for placing such storage device in controlling relationship to a recording element, whereby said recording elements are operated selectively to record data in the card under the control of said storage devices, and means for clearing said storage devices of the data stored therein when such data is recorded in the card.

5. Apparatus adapted to be controlled by a record tape bearing combinational code representations of data extending transversely of the tape, with each column containing an individual character representation, for recording such data on a record card having columns of index point positions at which data representations may be recorded selectively according to a statistical card code differing from said combinational code, and with each character of the data being recorded in an individual column of the card, such apparatus comprising tape scanning means for successively sensing the transverse columns of data representations on the tape so that the characters of data are sensed in sequence a whole character at a time, storage means containing storage devices arranged in sets corresponding respectively to the columns of the record card, with the individual storage devices in each set being equal in number and corresponding respectively to the various index point positions in each column of the card, translating means operatively interposed between said tape scanning means and said storage means for causing the tape code representations of data characters sensed by said scanning means to be stored in said storage devices as statistical card code representations of said characters, said translating means being operatively connected with said scanning means to function as a unit therewith for causing each card code representation of a character to be stored in a set of said storage devices substantially simultaneously with the sensing of the corresponding code representation of said character on the tape, recording means including a plurality of aligned recording elements selectively operable to record a line of indicia concurrently at corresponding index point positions on the record card during each operation of the recording means, means for operatively connecting said recording elements respectively to said storage devices in a predetermined sequence for causing the data representations stored in said devices to be recorded on the card by lines in said predetermined sequence, and means for clearing said storage devices of the data stored therein when such data are recorded in the card.

6. Apparatus for deriving data from an elongated source record having transverse columns each containing a combinational code representation of a data character and for recording such data in a record card bearing columns of index point positions at which representations of said data characters may be formed selectively according to a statistical code which differs from said combinational code, with corresponding index point positions in the various card columns being aligned lengthwise of the card, such apparatus comprising a plurality of storage devices arranged in sets corresponding respectively to the various card columns and with individual storage devices in each set corresponding respectively to the various index point positions of each card column, each of said sets being adapted to store the representation of a character, means for progressively sensing the transverse columns of the source record a whole column at a time for thereby sensing the representations of the data characters in sequence, means for operatively connecting said sets of storage devices in sequence to said sensing means for thereby activating said storage devices selectively under the control of the data representations sensed by said sensing means according to said statistical code, said connecting means including translating devices for connecting each combinational code representation of a character to the corresponding statistical code representation of said character, an alignment of selectively operable recording elements arranged to record indicia concurrently at selected positions in a line of corresponding index point positions extending lengthwise of the card, means for producing relative movement between said recording elements and the card for presenting the lines of index point positions on said card successively to said recording elements, and progressively operating means synchronized with the relative movement between said recording elements and the card for operatively connecting said recording elements to the respective storage devices corresponding to each line of index point positions when such line is presented to said recording elements, whereby said recording elements are selectively operated by the active storage devices for recording data representations in line-by-line fashion on the record card.

7. Apparatus for deriving data from a combinational code tape record having transverse columns each containing a representation of an individual data character and for recording such data in accordance with a statistical code differing from said combinational code in a record card bearing columns of index point positions extending across the card, with corresponding index point positions in the various columns being aligned lengthwise of the card, such apparatus comprising a plurality of storage devices arranged in sets corresponding respectively to the various card columns and with individual storage devices in each set corresponding respectively to the various index point positions of each column, each of said sets being adapted to store the representation of a single character, means for sensing the transverse columns of the tape record in sequence a whole column at a time for thereby progressively sensing the data characters represented in the tape record, transfer means for operatively connecting said sensing means to said storage devices and thereby activating said storage devices selectively under the control of the data designations sensed by said sensing means, said transfer means including means for converting each combinational code representation of a data character to the equivalent statistical code representation of said character, an alignment of selectively operable recording elements arranged to record indicia concurrently at selected positions in a line of corresponding index point positions extending lengthwise of the card, means for producing relative movement between said recording elements and the card for presenting the lines of index point positions on said card successively to said recording elements, and progressively operating means for placing said recording elements under the control of the respective storage devices corresponding to each line of index point positions when such line is presented to said recording elements, whereby said recording elements are selectively operated by the active storage devices for recording data representations in line-by-line fashion on the record card.

ALBERT RYFFEL.
CARL PAUL REHSTEINER.

REFERENCES CITED

The following references are of record in the file of this patent:

UNITED STATES PATENTS

| Number | Name | Date |
| --- | --- | --- |
| 1,780,610 | Weinlich | Nov. 4, 1930 |
| 1,803,954 | Weinlich | May 5, 1931 |
| 1,821,078 | Schaaff | Sept. 1, 1931 |
| 1,843,772 | Lasker | Feb. 2, 1932 |
| 1,976,600 | Carroll | Oct. 9, 1934 |
| 2,018,420 | Robinson | Oct. 22, 1935 |
| 2,172,754 | Lasker | Sept. 12, 1939 |
| 2,183,820 | Nelson | Dec. 19, 1939 |
| 2,211,165 | Robinson | Aug. 13, 1940 |
| 2,224,764 | Dickinson | Dec. 10, 1940 |
| 2,285,289 | Lake | June 2, 1942 |
| 2,340,801 | Doty | Feb. 1, 1944 |
| 2,377,801 | Mills | June 5, 1945 |
| 2,436,126 | Tholstrup | Feb. 17, 1948 |